Figure 3:
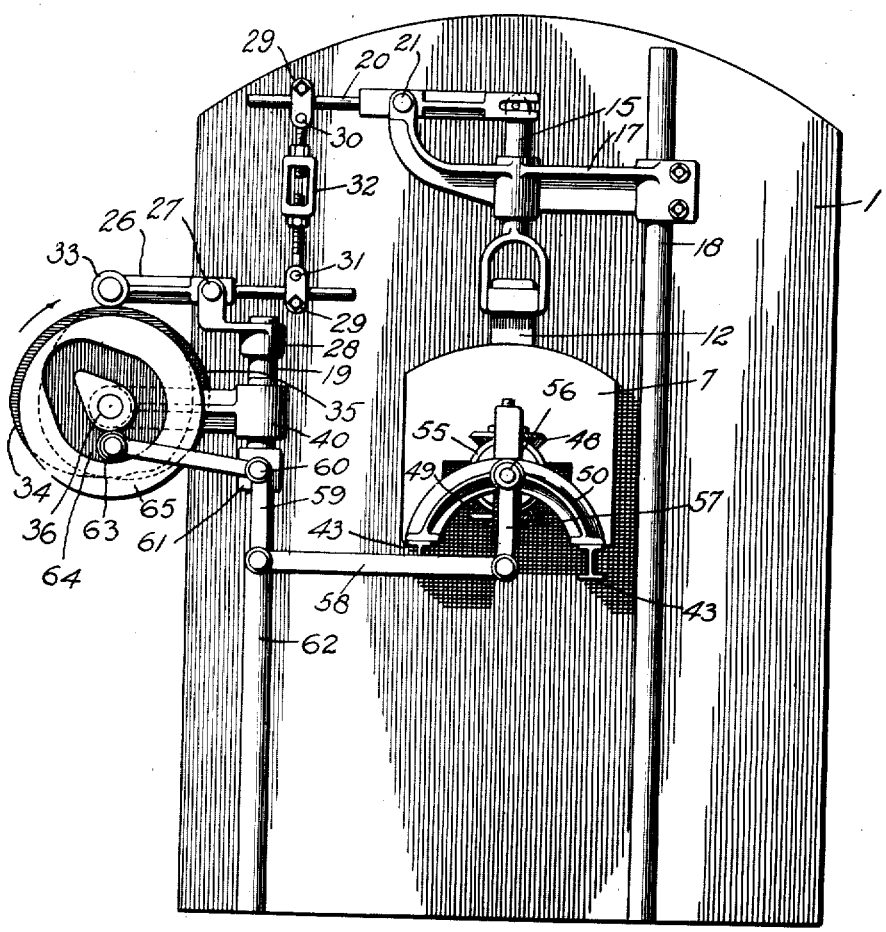

K. E. PEILER.
FEEDER FOR MOLTEN GLASS.
APPLICATION FILED AUG. 7, 1912.
1,277,255.
Patented Aug. 27, 1918.
5 SHEETS—SHEET 1.
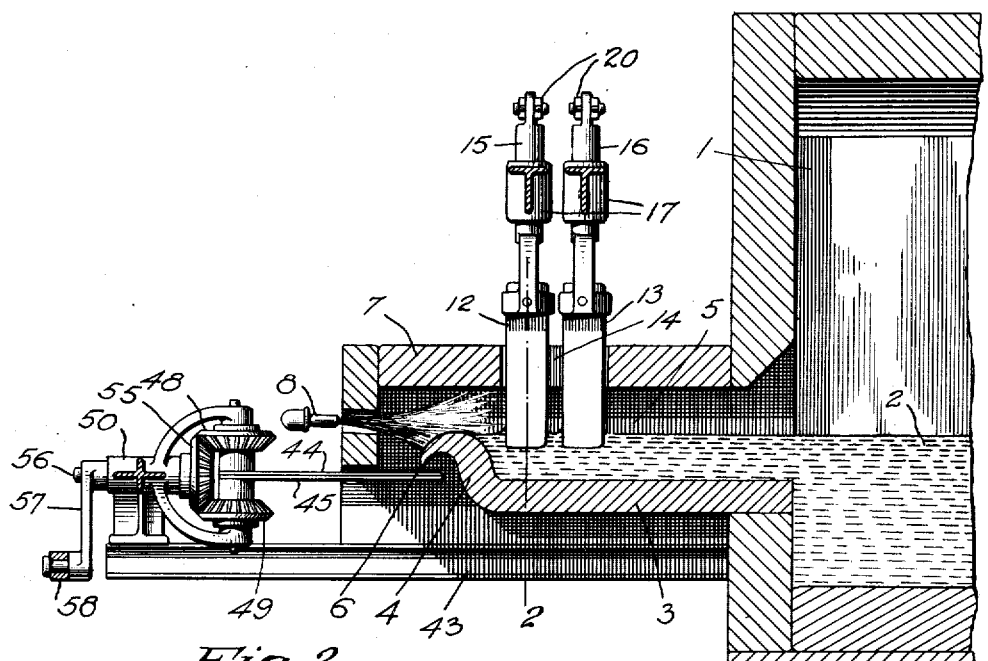
Fig. 1.
Fig. 2.
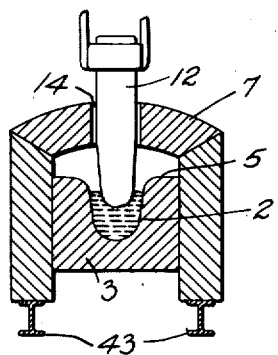
Witnesses:
Inventor:
Karl E Peiler
by Wm H Honiss
Atty.

K. E. PEILER.
FEEDER FOR MOLTEN GLASS.
APPLICATION FILED AUG. 7, 1912.

1,277,255.

Patented Aug. 27, 1918.
5 SHEETS—SHEET 2.

Witnesses:

Inventor:
Karl E. Peiler
by W. H. Honiss
Atty.

K. E. PEILER.
FEEDER FOR MOLTEN GLASS.
APPLICATION FILED AUG. 7, 1912.

1,277,255.

Patented Aug. 27, 1918.
5 SHEETS—SHEET 4.

Witnesses:
S. S. Grotta
E. R. Abbott

Inventor:
Karl E. Peiler
by W. H. Honiss
Atty.

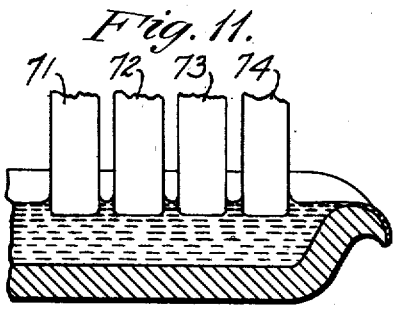
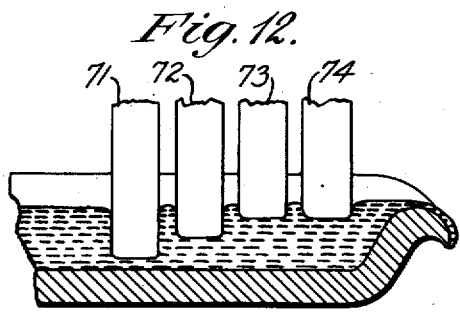
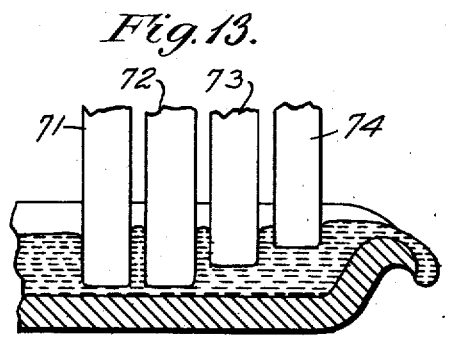
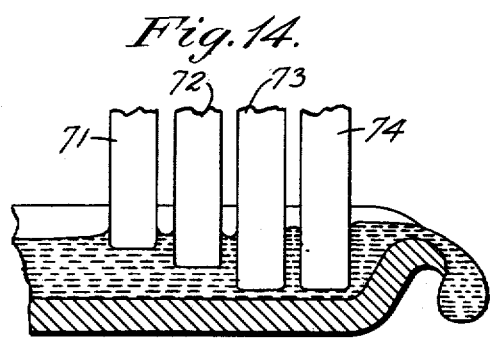
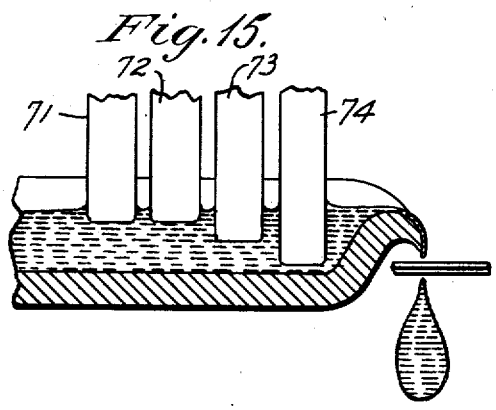
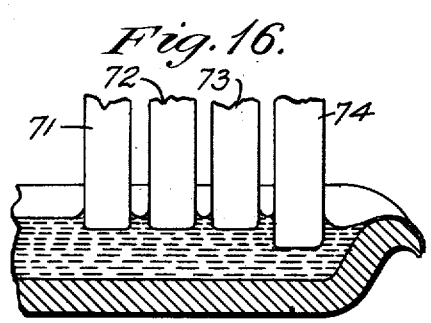

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

FEEDER FOR MOLTEN GLASS.

1,277,255.   Specification of Letters Patent.   Patented Aug. 27, 1918.

Application filed August 7, 1912. Serial No. 713,738.

*To all whom it may concern:*

Be it known that I, KARL E. PEILER, a citizen of the United States, residing at Hartford, in the county of Hartford and State of Connecticut, have invented new and useful Improvements in Feeders for Molten Glass, of which the following is a specification.

This invention relates to means for separating and feeding molten glass from a glass melting tank or furnace or other source of supply, in uniform drops or "gathers" delivered at uniform intervals of time, to glass shaping molds, or other devices, or for other purposes, the general object of the invention being to produce simple, effective and easily controlled and regulated devices for performing this function.

The feeding of molten glass is attended by peculiar difficulties, unlike those attendant upon the feeding of any other material. It must be maintained at a high and uniform heat, to insure the maintenance of a proper plastic condition. It is extremely viscous and adheres tenaciously to feeding and gathering implements, unless they are kept cool, in which case they are liable to injuriously chill the glass. Moreover, the separation of molten glass into drops or "gathers" tends to draw it out more or less unequally and irregularly into threads, which chill more quickly and easily than a more compact mass, and thus further increase the difficulty of separating the drops uniformly and maintaining them in the uniformly heated and plastic condition, which is essential for pressing or blowing or otherwise shaping the glass to best advantage.

In the present invention, these difficulties are overcome by flowing the molten glass from a melting tank or furnace or other source of supply, through an outlet from which the glass is impelled and discharged in a succession of waves or surges which are propagated by the action of a plurality of displacing members herein termed "displacers." The outlet is preferably provided with a dam, the top of which is approximately at the normal level of the glass, so that the succeeding waves or surges produced by the action of the displacers surge or wash over the dam, and settle down from the outlet in successive drops or globules, which may be made to take a pear shaped form, suspended for the moment from the end of the conduit by an attenuating thread of the glass. For some purposes the weight of the suspended glass may be relied upon to sever its suspending thread with sufficient uniformity and regularity; but where a considerable degree of uniformity and rapidity of action are required, it is preferable to provide other means, shown herein as shear blades, for severing the suspending thread at the required periods. The suspended end of the severed thread of glass, relieved from the weight of the drop is retracted by its own inherent tendencies, aided by its connection with the succeeding mass or wave of glass, which, following the retraction of the displacer, settles down, forming a trough of the wave as it were on the inside of the dam, thus tending to draw the thread over the dam, and thereby reincorporating it with its connected portion of the glass. This incorporation or absorption of the thread is preferably aided by heat from a jet or flame of gas playing upon the outlet, thus serving to maintain the glass and the threads at a temperature which keeps them in uniformly plastic condition.

Figure 4:
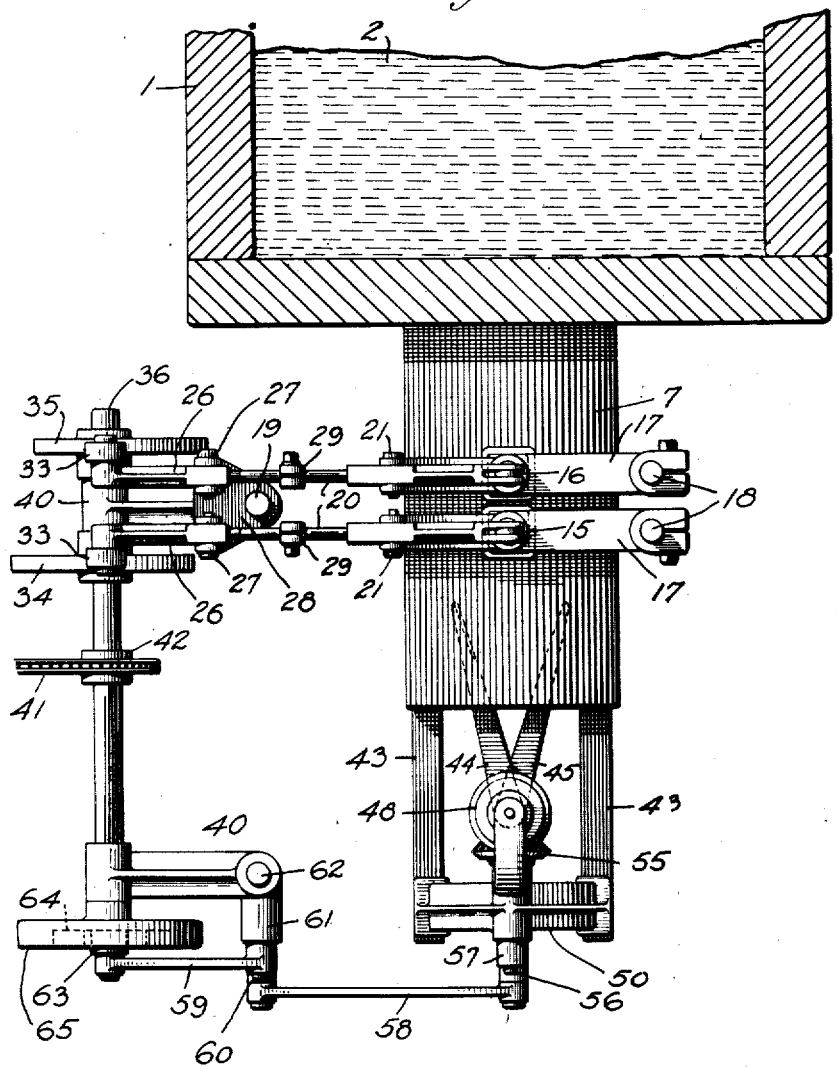
Figure 5:
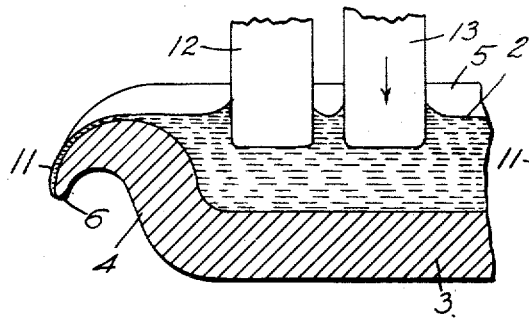
Figure 6:
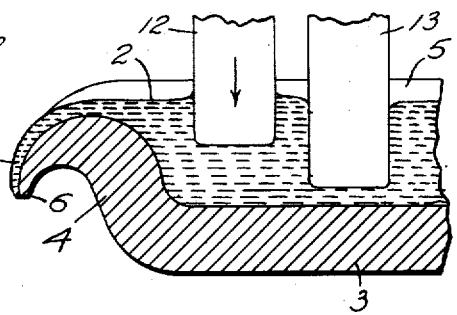
Figure 7:
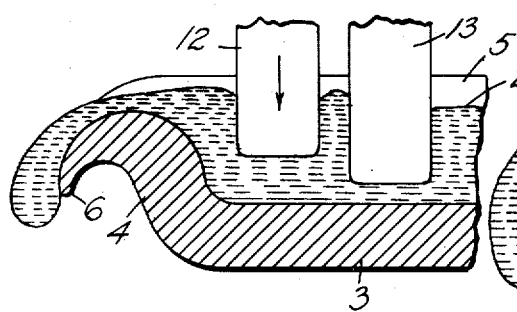
Figure 8:
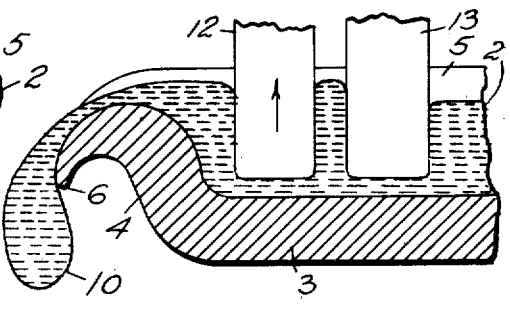

Figure 1 of the drawings is a side view of a preferred embodiment of this invention shown in connection with a glass melting tank or furnace, represented in section taken approximately along its longitudinal center. Fig. 2 is a front view in section taken on the line 2 of Fig. 1, showing a cross-section of the conduit. Fig. 3 is a front view projected from Fig. 1. Fig. 4 is a plan view projected from Figs. 1 and 3.

Figs. 5 to 10 inclusive are side views in section taken through the longitudinal center of the conduit, showing in enlarged scale the successive movements of the displacers and the consequent propagation of the waves or surges of glass. Figs. 11 to 16 inclusive are similar side views of a modified arrangement, illustrating the use of four displacers and illustrating their operation in propagating and advancing a wave or surge of glass.

The glass melting tank or furnace 1, containing a supply of molten glass 2 is provided with an outlet which is here shown as a conduit 3 into and along which the glass flows from the tank, and is maintained at approximately uniform level, either as a result of the operation of a continuous melting tank or in any other convenient or available way.

The discharging end of the conduit preferably terminates in a low wall or dam 4, the top of which is approximately at the normal level of the glass in the conduit, as shown in Fig. 1, while the side walls 5 of the conduit are higher. The outer side of the dam is provided with a depending apron or lip 6, to carry the glass clear of the end of the conduit, tank or other container, making a definite point of discharge. The conduit is preferably inclosed by a hood 7 to confine the heat of the glass, which may be regulated or augmented by a jet or flame of gas from one or more nozzles 8.

The molten glass in the conduit is impelled to and over the dam 4 in successive waves or surges, each discharging wave or surge carrying the required amount of glass for the desired drop or "gather". These waves are propagated and carried over the dam 4 by the operations of a plurality of displacers 12 and 13 made from refractory material which project into the glass through a slot or slots 14 in the hood or top of the conduit, or in the top of the tank or container. These displacers are clamped to, or otherwise suitably connected with the plungers 15 and 16, which are herein shown to be guided in the brackets 17 adjustably clamped upon the standards 18 rising from the floor or base of the machine, or otherwise attached to the frame thereof. The upper ends of the plungers 15 and 16 are connected with and operated by levers 20 which are pivoted at 21 upon the ends of their respective brackets 17, the outer ends of these levers being connected with cam levers 26, pivoted at 27 upon the bracket 28 supported by the standard 19. These connections between the levers 20 and their respective cam levers 26 are adjustable for varying the amplitude of the vertical movements of the displacers. These levers 20 and 26 are preferably disposed relatively to each other as shown in Fig. 3, when the displacers are at their highest position shown in Figs. 1 and 5, or at their lowest position, these levers being then in parallel relation to each other, so that the adjustment of the connecting rods along the levers in either direction, operate to increase or diminish that movement at one end of their respective strokes, without changing the position of the displacers at the other ends of their strokes.

The ends 29 of these connecting rods clamp upon the levers 20 and 26 and are jointed at 30 and 31 to permit the rocking movement of the levers. A turnbuckle 32 is also preferably provided in one or both of the connections for varying the length of one or both of the connecting rods, when desired, to correspondingly vary the endwise position of the path or stroke of one or both of the displacers independently of the length or amplitude of the respective strokes, to suit the height or the depth of the glass. The cam levers 26 engage by means of suitable rolls or pins 33 with the cams 34 and 35 upon the cam shaft 36. These cams are of a contour for producing the desired movement of the displacers and the cams are fastened upon the shaft in suitable relation to each other, so as to produce the desired alternations in the movement of the displacers relative to each other.

The gate displacer 13 should when in its lowest position be only sufficiently close to the sides and bottom of the conduit to prevent undue backward flow of the glass. The viscosity of the glass allows considerable clearance which is desirable on account of the somewhat rough and refractory character of the materials employed; and also because of their expansion and contraction, due to the extreme temperature ranges to which they are subjected.

The cam shaft 36 is mounted for rotation upon brackets 40 which are herein shown to be carried by the standards 19 and 62. The shaft is driven by means of a chain 41 upon the sprocket wheel 42 or in any other convenient way, from any available source of power. When employed in connection with glass pressing or other mechanism, these feeding mechanisms should be driven from or with, or otherwise synchronized with that mechanism.

Means for definitely severing the thread and thus releasing the suspended drop at regular intervals are preferably provided. As herein shown the severing means consists of shear mechanism, which may be mounted upon the I-beams 43 or any other part of the furnace structure, or upon the glass press or other machinery with which this feeder may be employed. The blades 44 and 45 of the shear which project beneath the end of the conduit, are attached to the respective hubs of the bevel gears 48 and 49 mounted for rotation in the bracket 50 supported on the I-beams 43. These bevel gears and their appurtenant shear blades are oscillated in opposite directions by means of the driving bevel gear 55 upon the shaft 56, also journaled in the bracket 50 and having upon its opposite ends an arm 57 connected by means of the rod 58 with a bell crank 59 supported on a pivot stud 60, carried by the bracket or collar 61 on the standard 62. The opposite end of the bell crank engages by means of a suitable pin or roller 63 with a cam groove 64 on the cam 65 carried by the cam shaft 36. The cam thus operates through its connections to open and close the shear blades at the proper intervals for cutting off the drop, as illustrated in Figs. 9 and 15.

Figure 9:
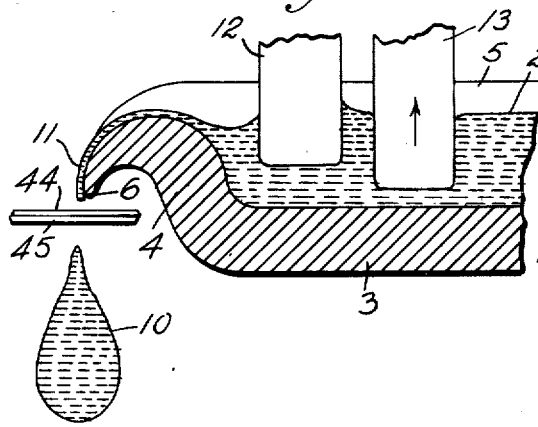
Figure 10:
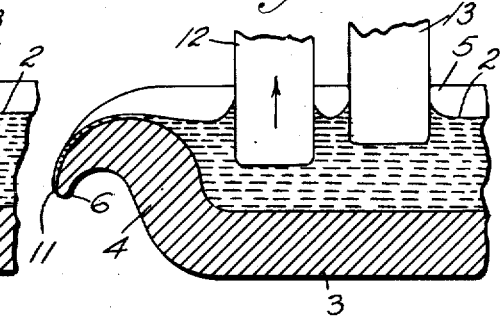

In the operation of this mechanism, the displacers operate as shown in Figs. 5 to 10 inclusive. In each of these views the displacer which is next to be moved is indicated by an arrow pointing in the direction of that next movement. From the position shown in Fig. 5 the displacer 13 moves down to the position shown in Fig. 6, and thus practically serves as a gate confining a pool of glass between it and the dam 4, and preventing the free backward flow of glass from the pool, the height of which is also increased by the displacement of glass due to the downward movement of the gate displacer 13. From this position, the displacer 12 moves downwardly to the successive positions shown in Figs. 7 and 8, thus raising to the required height the level of the glass in the now confined pool, and thereby further advancing the wave or surge of glass and flowing it over the top of the dam to the other side thereof, where it settles, suspended from the lip 6 in the form of a globule 10, which is then released by the shear blades 44 and 45 severing the thread 11 as shown in Fig. 9. At or before this time, the displacer 12 is raised, thus leaving room for the surrounding glass to sink down, and thereby draw back the severed end of the thread, as shown in Figs. 9 and 10, from which position the displacers retract to their first position shown in Fig. 5, thus allowing more glass to flow from the tank past the displacer to replace the quantity of glass previously displaced from the pool. This cycle of movements of the displacers is repeated for each drop or separated mass.

Figs. 11 to 16 illustrate a modified arrangement employing a larger number of displacers 71, 72, 73 and 74. These, however, act in substantially the same manner as those already described, to propagate a succession of waves for flowing the glass along a conduit which is similar to that shown in the preceding figures.

The severed drops of glass may be delivered to the molds or other receptacles for which they are intended, either by falling directly into the molds, or by falling upon a chute or conveyer by which the drops are transported to their destination. The length of the conduit, the width and depth of its channel for the glass, and the size and length of stroke of the displacers should be proportioned to the size of the drop or mass to be separated.

The mechanism which is herein shown to be supported upon standards or arms adjacent to or appurtenant to the furnace itself may be combined with or supported by the framing of the machine or other apparatus with which the feeder may be employed, and the displacing and shear mechanisms may be driven by or in synchronism with the mechanism of such adjunctive or coöperating machinery. Thus in various ways which will occur to those familiar with this art, the construction and mode of operation of this feeder may be modified in various ways to suit different circumstances or conditions of service.

In my co-pending application, Serial Number 133948, filed as a division or continuation of this application, I have described and claimed processes which the apparatus of this application is adapted to perform.

I claim as my invention:—

1. The combination, in feeders for molten glass, of a container for the glass, and means including a plurality of displacers coöperating to displace a succession of timed surges or waves of glass toward and over the side of the container.

2. Means for feeding regulated charges of molten glass from a container, including a displacing member mounted and guided for vertical movement in the glass adjacent to the container outlet, and mechanism for moving the plunger displacing member vertically, including means for varying the amplitude of the vertical movements of the said member.

3. The combination, in feeders for molten glass, of a conduit for the glass, and means including a plurality of displacers for successively displacing the glass in the conduit to propagate waves or surges of the glass along the conduit.

4. A feeder for molten glass including in combination a conduit for glass, and a plurality of displacers disposed side by side longitudinally of the conduit and movable successively downwardly and upwardly in the glass, coöperating with each other and with the conduit to advance successive waves of glass along the conduit.

5. A feeder for molten glass, including in combination a conduit for the glass, having a dam approximately at the normal level of the glass in the conduit, and a plurality of displacers adjacent to the dam, and mounted for successive movement into the glass, for displacing the glass to alternately raise and lower the level of the glass adjacent to the dam, to flow the glass over the dam in intermittent waves or surges.

6. The combination, in feeders for molten glass, of a conduit for the glass provided with a dam, a plurality of displacers, disposed adjacent to the dam, and means for moving the displacers in regulated succession to displace the glass adjacent to the dam and discharge it in timed successive surges over the dam.

7. The combination, in feeders for molten glass of a dam, a plurality of displacers arranged adjacent to the dam for movement downwardly and upwardly in the glass, and means for lowering the displacers in succession, beginning with the displacer farthest from the dam, to approximately shut off or partition or confine a pool of the glass adjacent to the dam, and then displace the glass from the said pool and flow it over the dam.

8. The combination, in feeders for molten glass, of a container for the glass, means including a plurality of displacers for propagating successive waves or surges of the glass toward and over the side of the container, means for moving the displacers in prescribed succession to propagate the wave movement, and means for adjusting the vertical positions of the respective displacers.

9. The combination, in feeders for molten glass, of a container for the glass, means including a plurality of displacers for propagating waves or surges of the glass toward and over the side of the container, and cams for moving the respective displacers in prescribed succession.

10. The combination, in feeders for molten glass, of a container for the glass, means including a plurality of displacers for propagating waves or surges of the glass toward and over the side of the container, cams for moving the respective displacers in prescribed succession, and means for adjusting the range of movement of one of the displacers.

11. Apparatus for feeding molten glass, including a container for the glass, means including a plurality of displacers for propagating waves or surges of the glass toward and over the sides of the container, and mechanism for automatically moving the respective displacers in a prescribed succession, including means for adjusting the endwise position of the path of movement of one of the displacers.

12. The combination, in feeders for molten glass, of a container for the glass, means including a plurality of displacers for propagating timed waves or surges of the glass toward and over the side of the container, cams for moving the respective displacers in prescribed succession and adjustable connections between one of the displacers and its cam for varying the amplitude and the range of movement of the displacer.

In testimony whereof I have signed my name to this specification in the presence of two subscribing witnesses this 6th day of August, 1912.

KARL E. PEILER.

Witnesses:
WILLIAM A. LORENZ,
E. R. ABBOTT.

It is hereby certified that in Letters Patent No. 1,277,255, granted August 27, 1918, upon the application of Karl E. Peiler, of Hartford, Connecticut, for an improvement in "Feeders for Molten Glass," an error appears in the printed specification requiring correction as follows: Page 3, line 86, claim 2, strike out the word "plunger;" and that the said Letters Patent should be read with this correction therein that the same may conform to the record of the case in the Patent Office.

Signed and sealed this 22d day of October, A. D., 1918.

[SEAL.]

R. F. WHITEHEAD,
*Acting Commissioner of Patents.*

Cl. 49—55.